United States Patent
Öjelund et al.

(10) Patent No.: US 12,350,127 B2
(45) Date of Patent: *Jul. 8, 2025

(54) INTRAORAL SCANNING WITH SURFACE DIFFERENTIATION

(71) Applicant: 3SHAPE A/S, Copenhagen K (DK)

(72) Inventors: Henrik Öjelund, Copenhagen Ø (DK); Asger Vejen Hoedt, Vallensbæk (DK); Karl-Josef Hollenbeck, Copenhagen Ø (DK)

(73) Assignee: 3SHAPE A/S, Copenhagen K (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,267

(22) Filed: Mar. 18, 2024

(65) Prior Publication Data
US 2024/0252289 A1 Aug. 1, 2024

Related U.S. Application Data

(63) Continuation of application No. 16/970,036, filed as application No. PCT/EP2019/053138 on Feb. 8, 2019, now Pat. No. 11,974,900.

(30) Foreign Application Priority Data

Feb. 16, 2018 (DK) .............. PA201870094

(51) Int. Cl.
*A61C 9/00* (2006.01)
*G06N 3/08* (2023.01)
*G06T 17/00* (2006.01)

(52) U.S. Cl.
CPC ............. *A61C 9/0073* (2013.01); *G06N 3/08* (2013.01); *G06T 17/00* (2013.01); *G06T 2210/41* (2013.01)

(58) Field of Classification Search
CPC ...... A61C 9/0073; A61C 9/0066; G06N 3/08; G06T 17/00; G06T 2210/41;
(Continued)

(56) References Cited

U.S. PATENT DOCUMENTS

| 7,698,068 B2 | 4/2010 | Babayoff |
| 7,720,267 B2 | 5/2010 | Fuchs et al. |

(Continued)

FOREIGN PATENT DOCUMENTS

| CN | 106066173 A | 11/2016 |
| CN | 107677371 A | 2/2018 |

(Continued)

OTHER PUBLICATIONS

First Office Action issued on Dec. 25, 2023, by the Chinese Patent Office in corresponding Chinese Patent Application No. 201980026060.1, and an English Translation of the Office Action. (20 pages).

(Continued)

*Primary Examiner* — Fayyaz Alam
(74) *Attorney, Agent, or Firm* — Buchanan Ingersoll & Rooney PC

(57) ABSTRACT

A method for generating a digital 3D representation of at least a part of an intraoral cavity, the method including recording a plurality of views containing surface data representing at least the geometry of surface points of the part of the intraoral cavity using an intraoral scanner; determining a weight for each surface point at least partly based on scores that are measures of belief of that surface point representing a particular type of surface; executing a stitching algorithm that performs weighted stitching of the surface points in said plurality of views to generate the digital 3D representation based on the determined weights; wherein the scores for the surface points are found by at least one score-finding algorithm that takes as input at least the (Continued)

geometry part of the surface data for that surface point and surface data for points in a neighbourhood of that surface point.

8 Claims, 9 Drawing Sheets

(58) Field of Classification Search
CPC . G06T 2207/20084; G06T 2207/30036; G06T 7/55; G03B 35/02; G03B 37/02
See application file for complete search history.

(56) References Cited

U.S. PATENT DOCUMENTS

| | | | |
|---|---|---|---|
| 8,170,306 | B2 | 5/2012 | Yu et al. |
| 8,878,905 | B2 | 11/2014 | Fisker et al. |
| 9,349,178 | B1 | 5/2016 | Itu et al. |
| 9,629,551 | B2 | 4/2017 | Fisker et al. |
| 10,041,793 | B2 | 8/2018 | Metzler et al. |
| 10,736,718 | B2 | 8/2020 | Esbech et al. |
| 2005/0089213 | A1 | 4/2005 | Geng |
| 2005/0283065 | A1* | 12/2005 | Babayoff ............ A61B 5/0088 600/407 |
| 2014/0120493 | A1 | 5/2014 | Levin |
| 2014/0212832 | A1* | 7/2014 | Fisker ................. A61B 5/0062 433/29 |
| 2015/0164335 | A1* | 6/2015 | Van Der Poel ...... A61C 9/0053 433/29 |
| 2016/0022389 | A1 | 1/2016 | Esbech et al. |
| 2017/0165038 | A1 | 6/2017 | Esbech et al. |
| 2018/0188043 | A1* | 7/2018 | Chen ........................ G06T 7/74 |

FOREIGN PATENT DOCUMENTS

| | | |
|---|---|---|
| EP | 1849411 A2 | 10/2007 |
| KR | 20150082428 A | 7/2015 |
| WO | 2014000745 A1 | 1/2014 |

OTHER PUBLICATIONS

Hazirbas et al; "FuseNet: Incorporation Depth into Semantic Segmentation vis Fusion-Based CNN Architechture," In: "Serous Games", Jan. 1, 2017, Springer international Publishing, Cham 032682, XP055572833.
International Search Report (with English Translation) and Written Opinion issued in corresponding International Patent Application No. PCT/EP2019/053138, 16 pages (Apr. 8, 2019).
Kazhdan M., et al "Screened Poisson surface reconstruction. ACM Transactions on Graphics" TOG. Jun. 1, 2013; 32(3):29.
Khoshelham et al; "Generation and weighting of 3D point correspondences for improved registration of RGB-D data." Proc. ISPRS Ann. Photogramm. Remote Sens. Spat. Inf. Sci. Nov. 11, 2013;5:W2.
Kronfeld et al; "Snake-Based Segmentation of Teeth from Virtual Dental Casts". Computer-Aided Design & Applications CAD Solutions, Jan. 1, 2010, p. 1, XP055573441.
Long, J., et al. Fully convolutional networks for semantic segmentation. In Proceedings of the IEEE Conference on Computer Vision and Pattern Recognition 2015 (pp. 3431-3440).
Newcombe RA, et al. KinectFusion: Real-time dense surface mapping and tracking. In: Mixed and augmented reality (ISMAR), 2011, 10th IEEE International symposium on 2011, Oct. 26 (pp. 127-136).
Raith S, et al. , "Artificial Neural Networks as a powerful numerical tool to classify specific features of a tooth based on 3D scan data", Computers in biology and medicine , Jan. 1, 2017, pp. 65-76.
Request for the Submission of an Opinion issued by the Korean Patent Office in Korean Patent Application No. 10-2020-7026369, dated Dec. 8, 2023, with English Translation (12 pages).
Hazirbas et al; "FuseNet: Incorporating Depth into Semantic Segmentation via Fusion-Based CNN Architecture," In: "Serious Games", Nov. 20, 2016, Springer international Publishing, Cham 032682, XP055572833, ISSN: 0302-9743, ISBN: 978-3-642-38979-5, vol. 10111, pp. 213-228, DOI: 10.1007/978-3-319-54181-5_14.
Kronfeld et al; "Snake-Based Segmentation of Teeth from Virtual Dental Casts", Computer-Aided Design & Applications CAD Solutions, 2010, p. 1, XP055573441, DOI: 10.3722/cadaps.2010.xxx-yyy, Retrieved from the Internet: URL:https://pdfs.semanticscholar.org/dcfe/1a357166508685d5e097b8139d9924dfd9d1.pdf [retrieved on Mar. 21, 2019].
Office Action (Notice of Allowance) issued on Aug. 26, 2024, by the Korean Patent Office in corresponding Korean Patent Application No. 10-2020-7026369, and an English Translation of the Office Action. (4 pages).
The extended European Search Report issued on Jul. 24, 2024, by the European Patent Office in corresponding European Application No. 24170132.5. (10 pages).

* cited by examiner

INTRAORAL SCANNING WITH SURFACE DIFFERENTIATION

CROSS REFERENCE TO RELATED APPLICATIONS

The present application is a continuation of U.S. patent application Ser. No. 16/970,036, which was filed on Aug. 14, 2020, which is a national stage application of PCT/EP2019/053138, which was filed on Feb. 8, 2019, which claims the benefit of Danish Patent Application No. PA 201870094, which was filed on Feb. 16, 2018. The entire contents of U.S. patent application Ser. No. 16/970,036, PCT/EP2019/053138 and Danish Patent Application No. PA 201870094, are incorporated herein by reference.

FIELD

Disclosed herein is a scanner system and method for scanning the intraoral cavity of a patient. In particular, the disclosure relates to stitching together a digital 3D representation of the intraoral cavity, taking into account tissue deformation during scanning. Score finding algorithms such as machine learning algorithms may be used to train the system to differentiate between various types of surfaces and weighting the different surfaces for stitching recorded views to a combined digital 3D representation.

BACKGROUND

In dentistry, 3D topography measurements of the patient's teeth and possibly other parts of the intraoral cavity are needed as a basis for restorative or orthodontic treatments. Traditionally, such 3D measurement has been performed by initially taking a physical impression. Because this procedure is generally unpleasant for the patients, more recently, intraoral 3D scanners have been used to directly measure the topography of the teeth or other parts of the intraoral cavity.

Due to size limitations, intraoral 3D scanners typically record small views at a time, with each view containing a distance map and possibly other information such as color. The views are stitched together incrementally to a combined 3D topography measurement as the scanner is moved. Such recording, e.g., for a single jaw's teeth and surrounding gingiva as region of interest, typically takes at least one minute and typically yields at least 100 views. The terms "registration" and "stitching" are generally used interchangeably in the literature. The stitched model, usually also converted to a surface, is often referred to as "virtual 3D model" or "digital 3D representation" of the 3D topography measured by the scanner.

Several types of surfaces within the intraoral cavity are not rigid. For example, cheeks and tongue may deform significantly during the recording. Gingiva may deform, too, however typically less so. Also, foreign objects are encountered during a recording with an intraoral scanner. Some foreign objects are rigid but highly movable and typically only present in some views of the recording, such as dental instruments. Other foreign objects like cotton pads may move less and be present in more views of the recording, but deform more. A dentist's finger typically both moves and deforms significantly in only a few views of a recording.

Because the stitching of views is generally based on the assumption of the scanned surface being stable and rigid, any moveable or deforming surfaces typically result in a loss of accuracy of the combined 3D topography measurement. Non-rigid stitching algorithms exist, but they are computationally expensive and require additional information, e.g., landmarks, that is generally not available during intraoral scanning.

Several means have been introduced to reduce the detrimental impact of movable or deformable surfaces on intraoral 3D scanning. One strategy is to keep such surfaces away from the views, e.g., by use of a cheek retractor. As a cheek retractor is often perceived as unpleasant by the patient and as it only solves part of the problem, data processing methods have been introduced.

U.S. Pat. No. 7,698,068 describes a method to distinguish teeth and other intraoral tissue based on color, and only use the part of the views representing teeth color for stitching during the recording. As teeth are rigid, and more white than other tissue, the quality of the combined 3D topography measurement can often be improved. However, teeth can be discolored, both naturally and by restorations, so a classification by color alone can be inaccurate. Also, non-white but rather rigid tissue such as the palatal rugae may be useful for stitching, particularly in edentulous cases, and should thus not be ignored. Furthermore, some deformable foreign surfaces, e.g., cotton pads, can have a color similar to that of teeth, but should be ignored for stitching.

U.S. Pat. No. 9,629,551 describes a method to detect moveable objects by analyzing the consistency of multiple views during the recording of the same part of the intraoral cavity. This method uses only geometrical information and hence is robust to color variability.

There remains a need for an intraoral 3D scanner, and a method of using the scanner that is generally robust to deforming or moving surfaces.

SUMMARY

In one aspect, disclosed herein is a method for generating a digital 3D representation of at least a part of an intraoral cavity, the method comprising:
  recording a plurality of views containing surface data representing at least the geometry of surface points of the part of the intraoral cavity using an intraoral scanner;
  determining a weight for each surface point at least partly based on scores that are measures of belief of that surface point representing a particular type of surface;
  executing a stitching algorithm that performs weighted stitching of the surface points in said plurality of views to generate the digital 3D representation based on the determined weights;
wherein the scores for the surface points are found by at least one score-finding algorithm that takes as input at least the geometry part of the surface data for that surface point and surface data for points in a neighbourhood of that surface point.

One or more processing units may be configured to apply an algorithm, such as a machine learning algorithm, trained on data to differentiate between various types of surfaces indicating types of tissue, other surfaces, and possibly erroneous data in the recorded views. Each view contains surface geometry data, at least some points $z(x, y)$ defined in a coordinate system relative to the scanner. A scanner and method according to an embodiment of this disclosure uses weighting for stitching recorded views to a combined representation of the 3D topography, also called a digital 3D representation. The weight of a point in the stitching is determined at least partly by scores that are measures of belief of that point representing at least one type of surface. Measures of belief and hence said scores can be heuristic measures or probabilities.

A scanner and method according to this disclosure may not necessarily detect tissue or foreign object movement or deformation directly. It typically differentiates by types of surfaces based on their assumed proclivity for moving or deforming, regardless of whether an actual surface of such type has moved or deformed during a scan. Surface types can be based on histology, e.g., dentin or mucosa. They can also be based on location, e.g., gingiva between teeth has a smaller proclivity for deformation than gingiva around a prepared tooth. Surface types can also be heuristic, e.g., whether or not they are desired in a digital 3D representation. Surface types that have a relatively smaller proclivity for deformation or movement are generally more desirable for stitching.

In this disclosure, differentiation by surface type may be based at least partly on surface geometry data, whereas the known art requires additional data for differentiation, e.g., surface color as in U.S. Pat. No. 7,698,068. Still, a scanner or method according to an embodiment of this disclosure may also provide and exploit additional surface data in views, e.g., surface color. A scanner or method according to this disclosure may also provide and exploit a certainty of the surface data it records.

Weighted stitching can be performed with one of the many variants of the Iterative Closest Point (ICP) algorithm or other appropriate algorithms in the art. Pair-wise weighting is described, see e.g., [1]. In another formulation of weighted stitching, surface data can be sorted based on their weights, and only some top quantile, or exceeding some threshold, is then used in the stitching. Weighted stitching in the sense of this disclosure is some mathematical formulation that expresses differentiation, such that some data in views have a relatively higher impact on the result than others.

The common coordinate system for the stitched model can be the local coordinate system of the first view. Stitching a view is to be understood as stitching the view's surface geometry data $z(x, y)$ by transforming them to a common coordinate system, while applying the same geometrical transform to any other surface data in the view. Surface data points within a view with zero or some small weight may be included in the transform, or they may be removed.

A digital 3D representation can be represented in several ways. Stitching alone at least provides a point cloud. It is often desirable to approximate a point cloud with a surface, e.g., a triangle mesh, evening out noise in the point data and providing a digital 3D representation that is a better basis for dental CAD. Some algorithms build such a surface after all views have been stitched, e.g., [2]. Some algorithms build some intermediate surface model incrementally for every view recorded and stitched, possibly also using that intermediate model to improve stitching, e.g., [3]. After all views are recorded, a final surface is often computed replacing the intermediate one. Surface data points with small weights, if not removed when the respective view was stitched, are often effectively removed in this step, because they are detected as noise.

In some embodiments, the points $z(x, y)$ are arranged as a distance map, i.e., as distances $z(x, y)$ from some reference surface defined relative to the scanner to the scanned surface. In some embodiments, the coordinates $(x, y)$ exist on a grid on a planar reference surface. A surface data point in the sense of this disclosure contains at least geometry information, i.e., $z(x, y)$. It can also be augmented with other data recorded for the surface at $(x, y)$, e.g., color, or some measure of the certainty of $z(x, y)$, or some other data.

For differentiation by surface type for a location $(x,y)$, a scanner of this disclosure takes into account the value $z(x, y)$, and also additional values of $z$ in a neighborhood of $(x,y)$. Considering a neighborhood can reveal some geometrical structure that is typical of a surface type. The neighborhood can be an immediate neighborhood, or a set of near regions that extend beyond the immediate neighborhood. It can be useful to apply a kernel to reveal geometrical structure, or a set of kernels. Considering the additional information contained in neighborhoods is another improvement over the known art.

In some embodiments, the score-finding algorithm is a machine learning algorithm. Any kind of machine learning algorithm may be used. Some examples of machine learning algorithms include artificial neural networks, such as deep artificial neural networks, convolutional artificial neural networks, or recurrent artificial neural networks. The machine learning method of embodiments of this disclosure may apply dimensionality reduction methods, such as principle component analysis or auto encoders.

In some embodiments, the machine learning algorithm comprises a neural network with at least one convolutional layer. Convolutional neural networks naturally provide a consideration of neighborhoods. For distance maps or color defined on or resampled to a grid of $(x, y)$, preferably an equidistant grid, many machine learning algorithms published for image analysis and image segmentation can be applied analogously. The algorithm for differentiating between surface types can also be a more classical machine learning algorithm, e.g., using support vector machines. The algorithm for differentiating between surface types can also be one that is based on more classical statistical methods, such as Bayesian statistics or a type of regression. Various of the above classes of algorithms can also be used in combination.

In some embodiments, the at least one machine learning algorithm is trained on a plurality of the types of surfaces that are commonly recorded with scanners in intraoral cavities. By annotating the training set images on the various types of surfaces normally found in intraoral cavities, such as teeth, gingiva, tongue, palate etc., the resulting weight determination will be more robust and consistent.

Training of a machine learning algorithm for differentiating between surface types can be supervised, semi-supervised, or unsupervised. For semi-supervised or supervised learning, training can be based at least partly on annotated views, or on annotated digital 3D representations. Annotations on a digital 3D representation can be back-projected to every view that contributed to that digital 3D representation, because the stitching also yielded the transformations of each view to a common coordinate system. Hence, the annotations can be carried over to the views, and can be used in training a machine learning algorithm based on views. Annotation can be performed by a human and/or some algorithm.

During scanning, the machine learning algorithm runs in inference mode, detecting scores that are a measure of belief of surface data belonging to one or more surface types. Typically, the scores can be represented as a vector with one value for each surface type in the inference. In embodiments using a neural network, the scores are typically obtained from the output layer, possibly after applying some transform such as a log-transform.

Measure of belief as used in this application means some score indicating a degree of certainty. A measure of belief can be a probability, particularly if the distribution of the underlying random variable is known or assumed known. When such knowledge does not exist nor any assumption seemed warranted, or if preferred for other reasons, a measure of belief can be some more subjective assessment and/or expression of said degree of certainty.

It can be convenient mathematically to have a score of one represent the certain belief that the surface data belongs to a particular surface type such as tooth or gingiva, whereas a score of zero represents the certain belief that the surface data does not belong to that particular surface type. Scores increasing from zero to one then represent an increasing belief that the surface data belongs to that particular surface type.

A weight for a surface data point in the stitching is found from the scores for that point, e.g., as a function of the scores. The embodiment where said function is 1 for the surface type with the highest score and 0 otherwise is known in the art as classification. An example of a machine-learning algorithm used for classification is [4]. It can be advantageous to use more refined functions, e.g., returning a value of 1 only if the highest score is significantly larger than all others, e.g., larger than the sum of all others. It can also be advantageous for the function to return non-zero values for several surface types, e.g., if there is reason to believe a surface data point can be either of the several surface types. The function may also return 0 for all surface types in cases where no score is large, or in similar poorly determined situations.

In some embodiments, the type of surface represents more than one type of intraoral tissue. In some instances, it can be advantageous to group different intraoral tissue types together, for example to group tooth surface together with the top of the gingiva, since that is useful for stitching together the digital 3D representation.

In some embodiments, the weight of each surface point in the stitching is also determined by weights for the types of surfaces. This means that the weight for some particular surface data point in the stitching is found from the scores and from surface type weights, e.g., as a linear combination over all surface types of the products of surface type weights and said scores. Surface type weights are preferably assigned a priori, with surface types desirable for stitching receiving higher weights and others being down-weighed. In some embodiments, some surface type weights are set to zero, so surface data of those surface types are filtered out from the views. There can be additional considerations impacting weight formulation, e.g., the size of a surface patch that a surface data point represents, e.g., because it is the nearest data point for all points inside the patch.

In some embodiments, inference can execute in real time or nearly in real time, while views are being recorded. This can allow for stitching to be in real time or nearly in real time as well. It is advantageous to perform stitching in real time, because a 3D representation of a site can be build up and visualized while the user scans, aiding the user in navigating the site. These embodiments are thus a clear improvement over other machine learning inference applications, such as, e.g., U.S. Pat. Nos. 7,720,267, 8,170,306, and 9,349,178.

Other embodiments of the machine learning inference according to this disclosure can execute more slowly, such as after two or more views have been recorded, but provide better accuracy. It is also possible to combine some limited degree of surface data weighting based on some inference from single data with additional surface data weighting based on some inference from multiple views, potentially providing a good combination of speed and accuracy.

In some embodiments, the surface data also comprises color information. Adding color information to the surface data may make the tissue type determination more secure.

In some embodiments, at least one machine learning algorithm was trained at least partly using data recorded by an intraoral scanner. Since there may be variation in the sensitivity and image quality between scanners from different manufacturers, the result will be more accurate the more closely the data used for training the machine learning algorithm matches the scans that will subsequently be acquired by a user.

In some embodiments, at least one machine learning algorithm was trained at least partly by an operator of the intraoral scanner. The scanner system of this disclosure may be supplied to the user with at least one pre-trained machine learning algorithm. In other embodiments, a user of the scanner performs at least some training after having received the scanner. For example, additional training data could contain color images or surface geometry data in which the special kind of gloves or cotton rolls a dentist uses appear. Additional training data could also originate from an ethnic group of patients that the dentist has an above-average share of. With additional training, the scanner can also adapt to the user's style of scanning. Additional training can be performed on one or more processing units of the scanner system or in the cloud. It can be advantageous to customize the machine learning algorithm with additional training because it will likely perform better.

In some embodiments, one score-finding algorithm is selected for one type of application and at least one other algorithm is selected for another type of application. It can be advantageous to train several machine learning algorithms for different types of applications, for later selection during inference. The selection of the appropriate algorithm can be made, e.g., by the user of the scanner in a user interface.

The types of applications may differ in the set of surface types trained for or inferred. For example, an algorithm with a set containing a surface type representing interdental papillae and gingival pockets may be relevant for monitoring patients with gingivitis. In another example, an algorithm with a set containing a surface type representing part of the gums could be relevant for edentulous patients, where tooth surface data is scarce and usually not enough for stitching.

In other embodiments, a type of application is characterized at least partly by at least one of a particular patient age group, a particular patient ethnicity, a particular style of treatment, a particular medical indication, a particular kind of equipment used together with the scanner, or a particular region of the intraoral cavity. For example, one algorithm may be best suited for children and another for adults, or for some ethnicity versus other ethnicities. Types of application can also represent different styles of dental treatment, e.g., as determined by organization- or region-specific standard operating procedures or equipment, or similar.

In some embodiments, the scores are summed over the plurality of views. When stitching together subscans, an interim digital 3D representation may be created. Each voxel in the interim representation may then be imaged from multiple views, and the scores can then be summed over the multiple views, to make a more robust score determination.

In some embodiments, other algorithms or criteria for filtering data from the recorded views are applied.

In some embodiments, one of said other algorithms evaluates geometric consistency across a plurality of views. One example thereof is moveable object detection based on geometric consistency as disclosed in U.S. Pat. No. 9,629,551 B1. During inference, filtering out surface data based on other criteria prior to finding scores simplifies the stitching problem, while filtering out surface data based on other criteria after finding said scores can improve overall results. During training, however, it can be advantageous to not filter based on other criteria, retaining relatively more training data in this manner.

An advantageous embodiment of this disclosure uses a combination of filtering based on geometric consistency and on semantic segmentation. In this embodiment, an excluded volume is built from all data in the same space as the digital 3D representation that is built up from only those surface data that belong to segments of desirable surface types. Parts of the digital 3D representation that are in the excluded volume can then be removed, such as after all views are collected and hence most information on the excluded volume has been collected. It is also feasible to stitch based on data passing the filtering only, but also retaining the filtered-out data for some later analysis.

In some embodiments, the scanner also supplies some certainty information of measured surface data for the recorded views, and where said certainty information at least partly determines the scores. In some such example embodiments, the scanner is a focus scanner, such as the focus scanner disclosed in U.S. Pat. No. 8,878,905. A focus scanner can supply a certainty of the measured z(x, y) data from the distinctiveness of a focus measure. Other kinds of 3D scanners can provide information on the certainty of measured surface data as well. For example, scanners that use triangulation or projected light patterns recorded with at least two cameras can provide two simultaneous views, and derive certainty from the degree of consistency between them. Other 3D scanners may deduce certainty from image contrast or from other information. Yet other scanners may provide certainty of other surface data such as color.

Certainties of surface data can be used to additionally modify their weights in the stitching, or they may be used during training and inference. Certainty, or other surface data in a view, can mathematically be expressed, e.g., as additional channels in an augmented distance map. Many machine learning algorithms published for multi-channel image analysis and image segmentation can then be applied analogously in this disclosure.

In another aspect of this disclosure, disclosed herein is a scanner system for generating a digital 3D representation of at least a part of an oral cavity, the scanner system comprising;
 a handheld intraoral scanner;
 a processing unit for executing a stitching algorithm that performs weighted stitching of surface points for a plurality of views to the digital 3D representation, the weight of each surface point in the stitching being determined at least partly by scores that are measures of belief of said surface point representing a particular type of surface; and
 the scores for a surface point are found by at least one score-finding algorithm that takes as input at least the geometry part of the surface data for that surface point and surface data for points in a neighbourhood of that surface point.

The data processing unit running the machine learning algorithm can be a part of the intraoral scanner, or they may be contained in another enclosure that the handheld scanner is connected to. Power demand and a regulatory requirement for the handheld scanner to stay relatively cool make it advantageous to place the processing means in a separate enclosure. The one or more processing units can be a PC, FPGA, or similar, may also contain a GPU, and may also perform other data processing. The processing units may be connected to a display on which the virtual model is shown as it is being stitched during scanning.

In some embodiments, the at least one score-finding algorithm is a machine-learning algorithm.

In some embodiments, the scanner has an at least nearly telecentric optical system. It is typically easier to train and use for inference a machine learning algorithm when views are not affected by scale, i.e., when a given surface type is imaged with same resolution and size over the entire depth of field of the scanner. A scanner with a telecentric optical system provides this advantage by construction, while a scanner with nearly a telecentric optical system, such as one with an angle of view greater than zero but below 10 degrees, provides an approximation thereof. For scanners with larger angle of view, it can be advantageous to resample views prior to use in machine learning. For example, an apparent orthonormal view can be computed given knowledge of the optical system from construction or calibration. As resampling can compensate for scale effects for size, but not resolution, a scanner with a nearly telecentric optical system can be preferable over a scanner that uses resampling.

In some embodiments of this disclosure, the scanner is a confocal intraoral scanner.

In some embodiments of this disclosure, the scanner can also supply and exploit some certainty information of measured surface data. In some such example embodiments, the scanner is a focus scanner, such as the focus scanner disclosed in U.S. Pat. No. 8,878,905. A focus scanner can supply a certainty of the measured z(x, y) data from the distinctiveness of a focus measure. Other kinds of 3D scanners can provide information on the certainty of measured surface data as well. For example, scanners that use triangulation of projected light patterns recorded with two cameras can provide two simultaneous views and derive certainty from the degree of consistency between them. Other 3D scanners may deduce certainty from image contrast or from other information. Yet other scanners may provide certainty of other surface data such as color.

Certainties of surface data can be used to additionally modify their weights in the stitching, or they may be used during training and inference. Certainty, or other surface data in a view, can mathematically be expressed, e.g., as additional channels in an augmented distance map. Many machine learning algorithms published for multi-channel image analysis and image segmentation can then be applied analogously according to embodiments of this disclosure.

It is typically easier to train and use for inference a machine learning algorithm when views are not affected by scale, i.e., when a given surface type is imaged with same resolution and size over the entire depth of field of the scanner. A scanner with a telecentric optical system provides this advantage by construction, while a scanner with nearly a telecentric optical system, such as one with an angle of view greater than zero but below 10 degrees, provides an approximation thereof. For scanners with larger angle of view, it can be advantageous to resample views prior to use in machine learning. For example, an apparent orthonormal view can be computed given knowledge of the optical system from construction or calibration. As resampling can compensate for scale effects for size, but not resolution, a scanner with a nearly telecentric optical system can be preferable over a scanner that uses resampling.

In another aspect, disclosed herein is a computer program product containing program code containing instruction embodying any one or more of the methodologies or functions disclosed herein.

BRIEF DESCRIPTION OF THE DRAWINGS

The above and/or additional objects, features and advantages of embodiments of this disclosure, will be further described by the following illustrative and non-limiting detailed description of embodiments of the present disclosure, with reference to the appended drawing(s), wherein.

DETAILED DESCRIPTION

Figure 1:
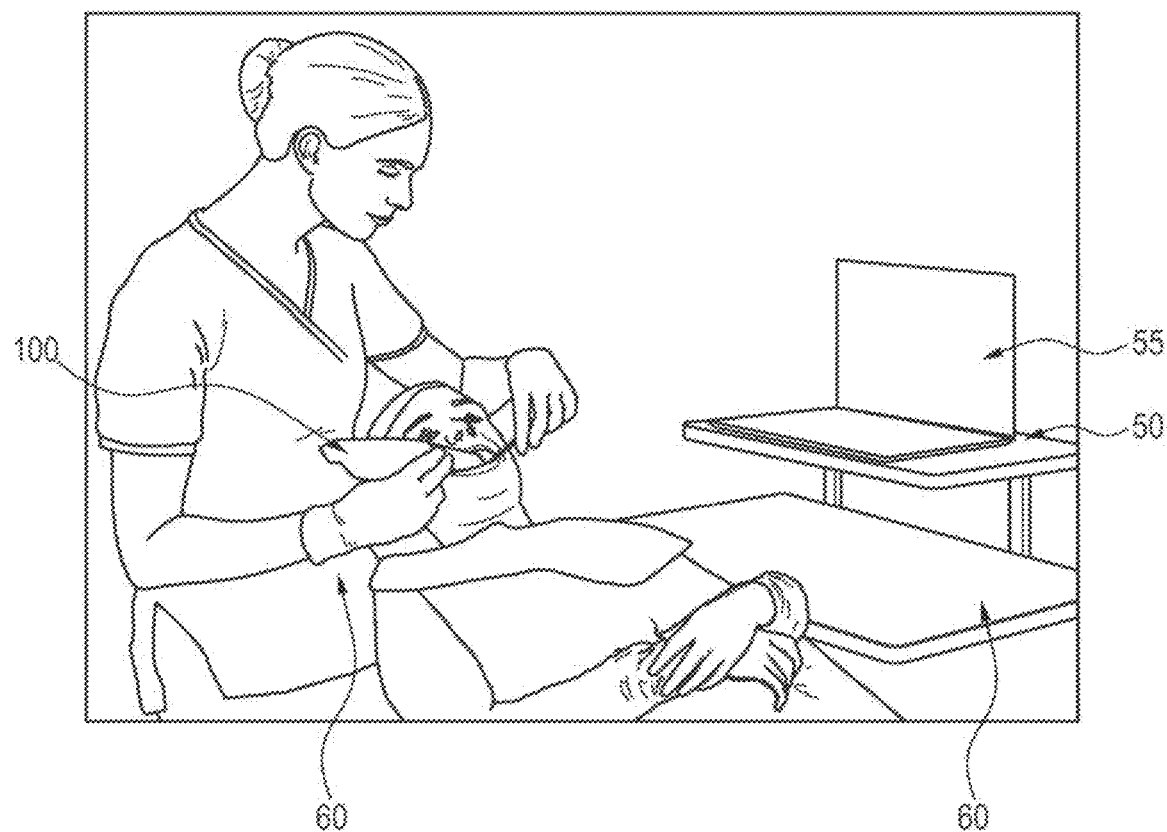
FIG. 1 shows a scanner system according to an embodiment of this disclosure.

FIG. 1 shows an example application of a scanner system according to an embodiment of this disclosure. The dentist holds the handheld scanner 100. This handheld scanner is usually connected by a cable 60 to a laptop computer 50 with a screen 55. In some cases the handheld scanner may be wireless. The digital 3D representation that is a result of stitching is displayed during scanning on screen 55. The display updates with time, as new views are recorded and stitched to the digital 3D representation. The laptop 50 is the enclosure for one or more processing units including a CPU and a GPU that execute the algorithms of embodiments of this disclosure. Some scanners communicate with the processing means by wireless transfer rather than a cable.

Figure 2:
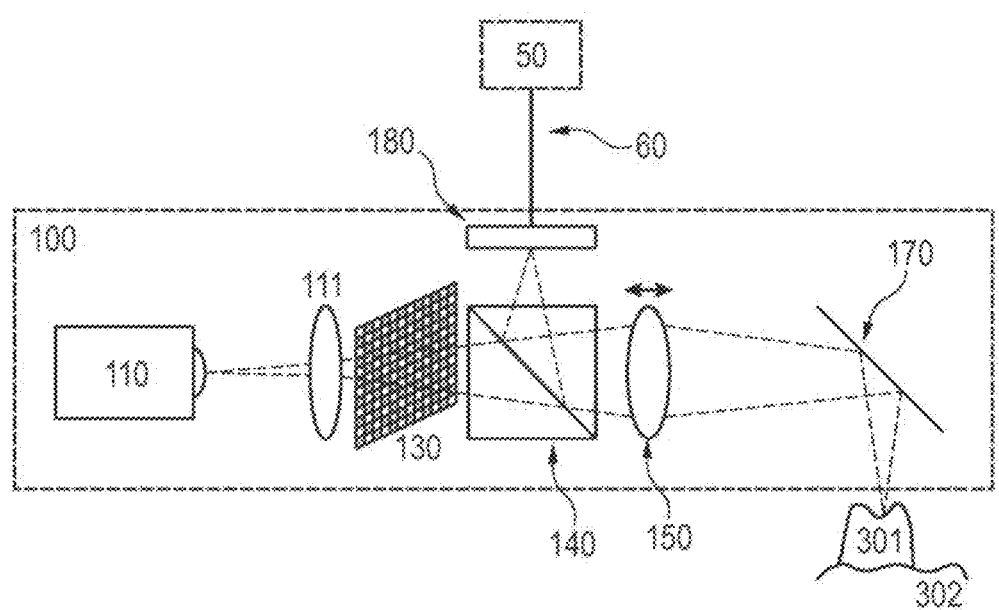
FIG. 2 shows a schematic view of an example handheld part of a scanner system according to an embodiment this disclosure.

FIG. 2 schematically shows an example of a handheld part 100 of the intraoral scanner according to an embodiment of this disclosure. It comprises a LED light source 110, a lens 111, a pattern 130 (a line in a true cross-sectional view, but shown here at an angle for clarity), a beam splitter 140, and an image sensor 180. The scanner is a focus scanner owing to a moveable lens 150. A mirror 170 that folds the beam path towards a part of the intraoral cavity being scanned, comprising a tooth 301 and gingiva 302. Also shown as dashed lines are some light rays emitted from the light source 110, transmitted through the optical system onto a location on the tooth surface where they focus, returned through the optical system, and imaged onto sensor 180, where they focus, too. For the position of focusing lens 150 shown in FIG. 2, some gingiva 302 is visible, but not in focus. It could come into focus for other positions of lens 150.

Figures 3A, 3B:
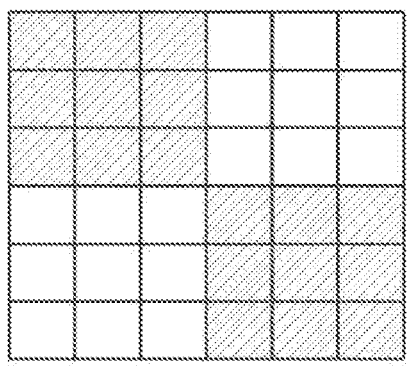
FIGS. 3A and 3B show a view of one spatial period checkerboard pattern disclosure.
Figure 4:
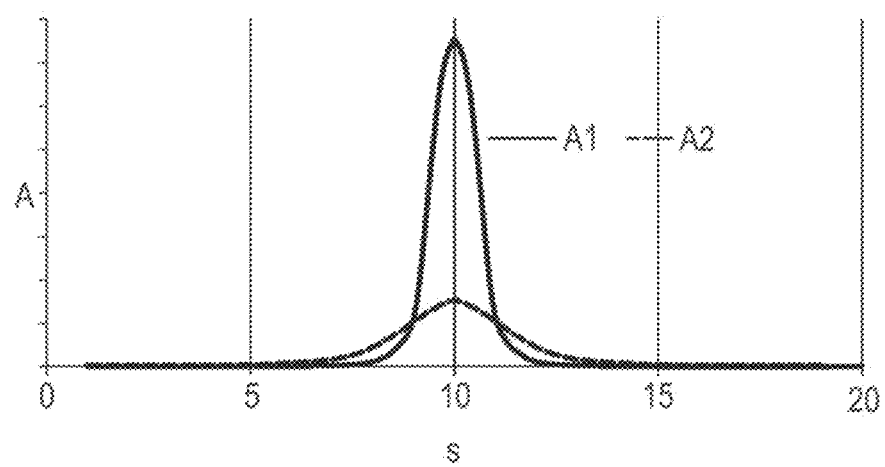
FIG. 4 shows exemplary curves for two pixel groups having their maximum at the same location according to an embodiment of this disclosure.

FIGS. 3 and 4 show how data from the exemplary handheld scanner 100 are processed to yield distance maps. FIG. 3a is a view of one spatial period checkerboard pattern 130 as seen by the image sensor 180 when the image of that spatial period on the scanned surface is in focus. In the extreme case of a completely defocused image of the pattern, the image sensor would see a uniform gray. It is advantageous if image sensor pixels and pattern are aligned such that the borders of the pattern are imaged to borders of pixels. As FIG. 3b shows, the pixels that are expected to be dark when the surface is in focus are assigned weight f(i)=−1, while the expected bright ones are assigned a weight f(i)=1, where i is a pixel index.

As the focus lens is moved, images are taken. The positions s of the focus lens for every image is found by an encoder and appropriate interpolation if needed. For all pixel groups in the image for position p, a correlation measure is computed as $$A(s) = \sum_{i=1}^{n} f(i)I(i)$$

where I(i) are the measured intensities in the pixels. For the example of FIG. 3b, i runs from 1 to n=(6*6)=36. Note that typically, there are many spatial periods in a typically rectangular pattern 130 and its image on sensor 180, e.g. N=100*120=12,000 pixel groups, so the image would consist of at least 36*12,000 pixels in that example.

A pixel group is in focus when A is at its maximum over all s, i.e., over all images in a series obtained within a pass of the focus lens. The location of that maximum then determines the distance z(s) to the measured surface, because the scanner's optics are known from construction and hence, the location of the focus plane for all pixel groups and all positions of lens 150 is known. The distance z(s) can also be found from or refined by calibration. With the plane of and some point on the image sensor defining a coordinate system relative to the scanner, and each pixel group having (x, y) in that coordinate system, such as the center of the pixel group, the distance z(s) for a given pixel group yields a point z(x, y). As all pixel groups have same size, all locations (x, y) from a grid.

Note that if a pixel group is completely out of focus at some position s, i.e., all pixels have the same value, A=0 at that s. Note also that some pixel groups may never come into focus, e.g., when there is no surface to image, or when a surface exists, but is outside the focus range. It is not possible to determine a distance for such pixel groups.

The focus lens should be moved quickly so that a given pixel group at least approximately represents the same region of the scanned surface even in the presence of some hand motion. For example, the focus lens can pass through all s with a cycle frequency of 10 Hz, travelling back and forth, so with 20 passes per second. At the same time, the number of images during a pass should be rather high to yield good resolution of distance measurement, such as 200. This means the image sensor must be rather fast, in this example, it would need to take images at a rate of 10 Hz*2*200=4000 Hz.

FIG. 4 shows two exemplary curves A(s) for a pixel group. Both have their maximum at the same location s=10.

Curve A1 has a more distinct maximum than A2 in the sense that both maximum value of is higher and the width of non-zero zone is smaller for A1 than for A2. A distance measurement based on curve A1 can thus be considered more certain than a measurement based on curve A2. There can be several reasons for less certain distance measurements. Some are due to properties of the scanned surface, e.g., that surface being sloped relative to the view angle, or having varying reflectivity. Hand motion often leads to less certain distance measurements, too. Certainty could be quantified, e.g., as the maximum value, the logarithm of the maximum value, the reciprocal of the width of the zone with A being higher than half its maximum value, or similar.

In summary, the exemplary scanner provides distance maps with one z value per pixel group with coordinates (x, y) with associated certainty q, or being undefined. The combination of (z, q) (x, y) can be called an augmented distance map, analogous to an image with two channels. A full 3D representation of the scanned part of the intraoral cavity is then obtained by stitching the augmented distance maps obtained with various scanner poses.

Other types of 3D scanners include triangulation 3D laser scanners and structured-light 3D scanners. A triangulation 3D laser scanner uses laser light to probe the environment or object. A triangulation laser shines a laser on the object and exploits a camera to look for the location of the laser dot. Depending on how far away the laser strikes a surface, the laser dot appears at different places in the camera's field of view. This technique is called triangulation because the laser dot, the camera and the laser emitter form a triangle. A laser stripe, instead of a single laser dot, may be used and is then swept across the object to speed up the acquisition process.

Structured-light 3D scanners project a pattern of light on the object and look at the deformation of the pattern on the object. The pattern may be one dimensional or two dimensional. An example of a one dimensional pattern is a line. The line is projected onto the object using e.g. an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time. Other 3D scanner principles are well known in the art.

Figure 5A:
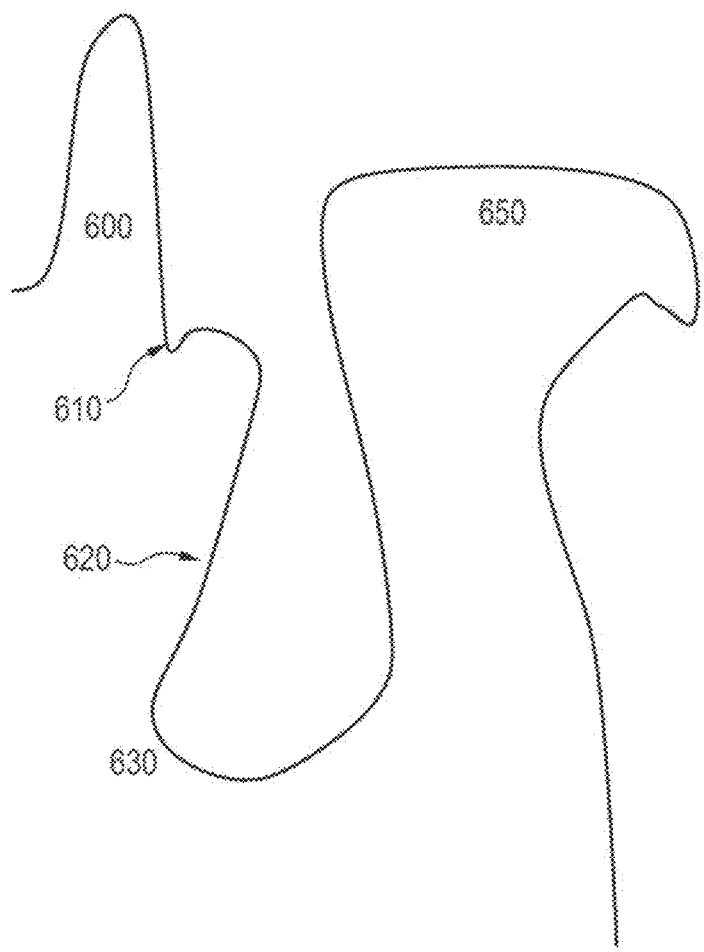
FIG. 5a shows a cross-sectional view of a part of the lower oral cavity according to an embodiment of this disclosure.

For an example of how to arrive at a set of surface types, reference is made to FIG. 5a. The figure shows in a cross-sectional view the lower mouth, with an incisor tooth 600, its gingival margin 610, gingiva 630, and lower lip 650. One possible set of surface types would simply be according to these three types of tissue. However, for better training, it can be advantageous to reduce the number of surface types in the set. Taking as an example a general-purpose type of application that has the goal to record teeth and near gingiva, one can lump "tooth" with some near gingival tissue, e.g., up to point 620, with the remainder being a second surface type. The former is "desirable" for stitching, the latter is "undesirable". Point 620 (a line in 3D) need not have anatomical meaning, but could, e.g., be set from the extent of the scanner's field of view when the scanner is imaging at least some part of a tooth. Any surface of a dental instrument, a finger, cotton pad, or other artifacts is also lumped into the "undesirable" type in this example.

Figure 5B:
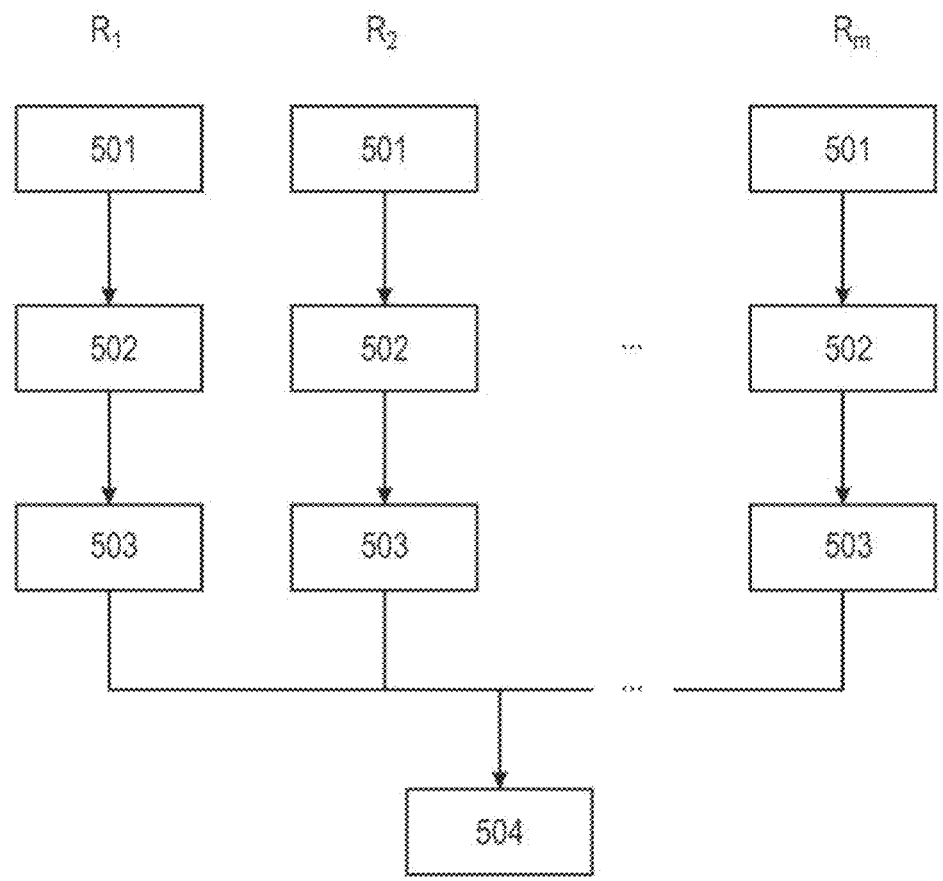
FIG. 5b shows a procedure for training a machine learning algorithm according to an embodiment of this disclosure.

An example for a procedure for training a machine learning algorithm according to an embodiment of this disclosure is shown in FIG. 5b.

In step 501, the scanner is used to create a digital 3D representation of a part of an intraoral cavity by recording multiple augmented distance maps that are stitched, as explained for FIGS. 1 to 4. Some views and hence some augmented distance maps could contain a dental instrument, a finger, cotton pad, or other artifacts. These artifacts may at least partly be represented in the digital 3D representation, making that model a relatively poorer representation of the intraoral cavity.

In step 502, portions of the digital 3D representation are annotated by the surface type as defined above for FIG. 5a. Annotation can, e.g., be performed by a human in a graphical user interface. Annotation could also be semi-automated, with the human receiving suggestions obtained with other methods, e.g., traditional image analysis algorithms.

In step 503, the annotated portions are projected back to the individual augmented distance maps, using the inverses of the transformations found in the stitching. This provides for class map c(x,y) for each augmented distance map, where c is a class indicator. Because annotation supposedly provides perfect information, one-hot encoding is used to arrive at a vector of scores p of a part of an augmented distance map belonging to any of the surface types of step 502. Hence, in p, the element for class c set to 1 and all others are set to zero. In the example used here, p has two elements, one for "desirable" and one for "undesirable".

Steps 501-503 are carried out for many similar recordings $R_1, R_2, \ldots, R_m$, such as at least m=2 recordings. The number of recordings m could also for example 10, 20, 50, 100, 200, 500 or 1000, or any number of recordings there between or higher. The recordings are similar with respect to the part of the intraoral cavity that is scanned, and they may also be similar with respect to artifacts in some views, affecting in an analogous way the m digital 3D representations created from the m recordings.

In step 504, a neural network is trained to predict p(x, y) for (z, q) (x, y). Uncertainty q is taken as the logarithm of the maximum value of A, as explained for FIG. 4. As the scanner outputs a distance map that is defined on a rectangular grid as explained above, the augmented distance map (z, q) (x, y) can be interpreted as a two-channel rectangular image that becomes the input to the neural network.

Note that steps 501-504 could also be performed for single distance maps, for single augmented distance maps, both cases resulting in no stitching and trivial back-projections, or for multiple distance maps, albeit it is preferable to conduct them for multiple augmented distance maps as that constellation provides most information. For a scanner also providing color data, training and prediction could be formulated as p(x, y) for (z, q, r, g, b) (x, y), where r, g, b are the red, green, and blue components of a color measurement; analogously for other or additional data provided by the scanner.

Figure 6:
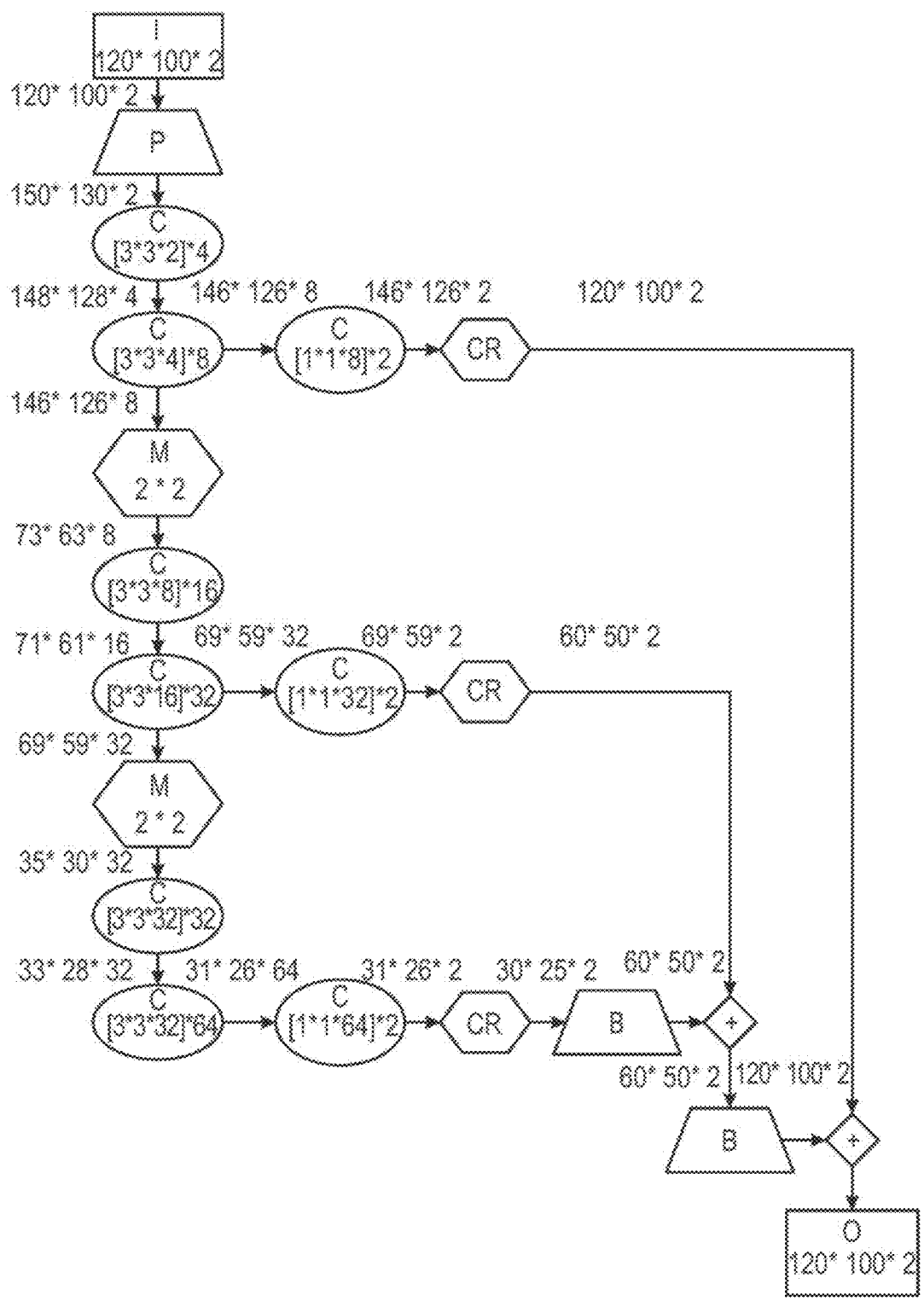
FIG. 6 shows the architecture of a suitable convolutional neural network according to an embodiment of this disclosure.

FIG. 6 shows an example architecture of a suitable convolutional neural network, with:
  I: the input image with width 120 and height 100 (the example values used in the explanation of FIGS. 3 and 4) and two channels for z and q, resp.
  P: zero-padding with a 15-pixel width border around the image.
  C: a convolutional layer followed by a rectified linear unit.
  CR: a cropping layer to reduce size to fit the subsequent layer's operation
  B: an upscaling layer, using a factor 2 and bilinear interpolation
  M: a max-pooling layer
  +: a layer for element-wise addition of corresponding channels O: the output image with number of channels equal to the dimension of p (two in the example used here)

The dimensions of data in the various layers and operations is also shown in FIG. 6. Many network architectures are possible. Preferably, the neural network has convolutional layers with small kernels, such as 3×3×M, where M is the number of channels. The impact of surface point neighborhoods follows from the use of convolutional layers. The impact of wider neighborhoods follows from the use of max-pool layers.

Because it is defined for the same (x, y) as the input image, the output image has same width and height as the input image, so for every input surface data point, there is an output p.

Figure 7A:
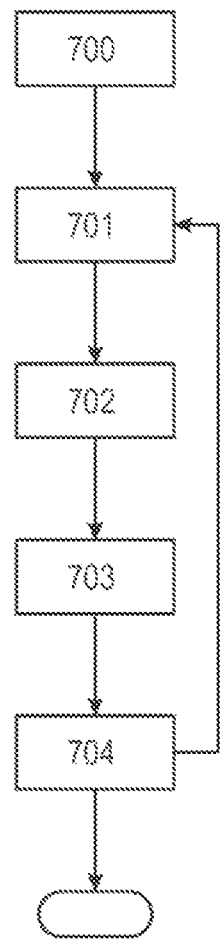
FIG. 7A shows an example of how a trained machine learning algorithm may be applied in inference mode according to an embodiment of this disclosure.

FIG. 7a shows a first example of how a trained machine learning algorithm is applied in inference mode.

In step 700, a set of surface types to predict is chosen. Only surface types defined during training, in step 502, can be chosen in step 700, but possibly some training types can be grouped. For the example at hand, it is assumed that training and inference sets are the same, with the two surface types "desirable" and "undesirable". However, any number of surface types defined during training may be used.

In step 701, an augmented distance map (z, q) (x, y) is recorded.

In step 702, the score vector p (x, y) for (z, q) (x, y) is inferred for all points (x, y) in the recorded augmented distance map. The machine learning algorithm provides the inference. For the example convolutional neural network of FIG. 6, p (x, y) is given by the values with coordinates (x, y) in the multi-channel output image O, i.e., each channel provides one element of the vector p.

In step 703, a weight w for p (x, y) in the stitching is found from surface type weights and a function of scores, e.g., as a dot product $$w = wg(p(x, y))$$

where w is a vector of surface type weights and g is a vector of evaluations of a function g of the scores. For the example, w could be chosen as [1, 0] (the first element referring to the "desirable" surface type). The function g could be chosen, e.g., as $$g(p(x, y)) = \begin{cases} 1 & \text{if } p_{desirable}(x, y) > 0.6 \\ 0 & \text{otherwise} \end{cases}$$

Values other than 0.6 could be used depending on preference, preferably values above 0.5, but in principle also values below 0.5 could be used. In step 704, the points z (x, y) are stitched to the digital 3D representation build from previous views, weighted according to their weights found in step 703. For example, a standard ICP algorithm is used for the stitching, and all points with w>0 are included in the underlying minimization problem. For the very first view, the digital 3D representation is set to the points z (x, y).

The procedure can then repeat from step 701 for additional views, typically taken from different poses as the operator moves the scanner, or it can terminate, typically if the operator decides the digital 3D representation is complete. That first digital 3D representation is then often converted to a second one, a mesh.

Figure 7B:
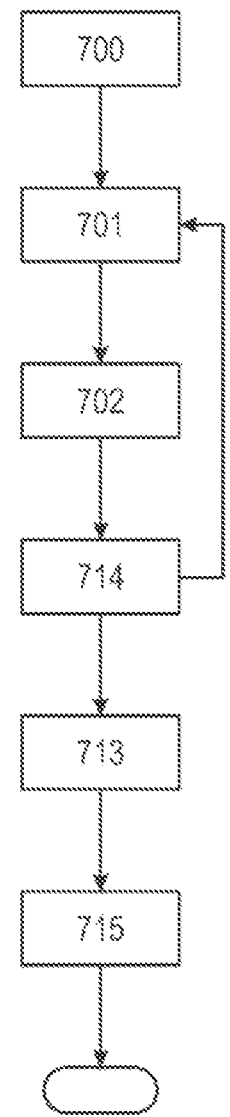
FIG. 7B shows another example of how a trained machine learning algorithm may be applied in inference mode according to an embodiment of this disclosure.

FIG. 7b shows a second example of how a trained machine learning classification algorithm is applied in inference mode.

Steps 700 to 702 are as in the first example of FIG. 7a.

In step 714, all points z (x, y) are stitched to an interim digital 3D representation built from previous views, and so are the values of p (x, y), thus receiving spatial coordinates in the space of the digital 3D representation as (X, Y, Z) and p (X, Y, Z), resp. For practical purposes, the interim virtual model's 3D space is represented as voxels, and the values of p (X, Y, Z) are assigned to the nearest voxel. In each voxel, values of p are summed over views, and a count of how many values are added is maintained, such that, e.g., an average can be computed later.

The procedure can then repeat from step 701 for additional views, typically taken from different poses as the operator moves the scanner, or it can terminate, typically if the operator decides the interim digital 3D representation is complete.

In step 713, weights are found in manner analogous to step 703, but for the average p, that average found by dividing the sum by the number of values. Voxels with weight 0 are filtered out, and so are voxels without any values.

In step 715, a final virtual model is built from the points (X, Y, Z) in the remaining voxels, e.g., using the marching cubes algorithm.

Figure 8:
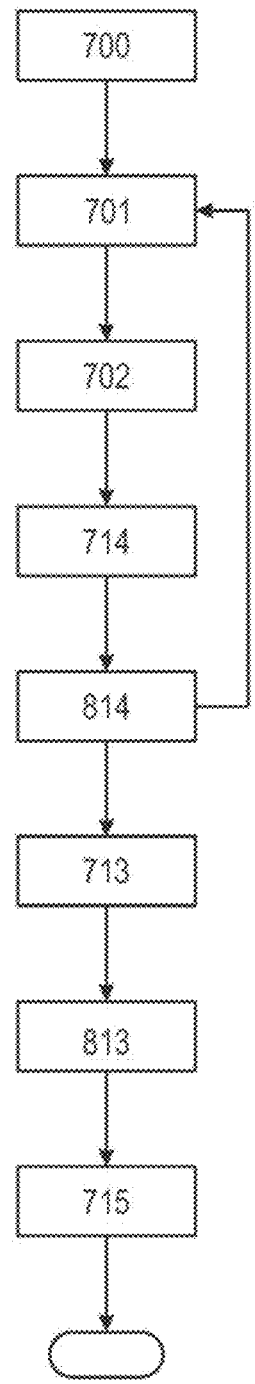
FIG. 8 shows an example of how the algorithm of FIG. 7b is expanded to also use filtering based on excluded volume according to an embodiment of this disclosure.

FIG. 8 shows an example of how the algorithm of FIG. 7b is expanded to also use filtering based on excluded volume. To begin with, the excluded volume is empty.

Steps 700-702 and 714 are as explained above for FIG. 7.

In step 814, the excluded volume is updated with the stitched points (X, Y, Z) from step 714. An excluded volume is, e.g., the space from a seen surface up to the scanner, and the scanner body. For practical purposes, exclusion could be expressed on the same voxel space as used in step 714. A binary flag can indicate whether a voxel is part of the excluded space.

The procedure can then repeat from step 701 for additional views as described above. As more views are recorded, the number of voxels that are flagged as being in the excluded space can grow, but never decrease.

Step 713 is as explained above for FIG. 7.

In step 813, all voxels that still contain values of summed p, but that are in the excluded volume, are deleted. This step is easiest to implement if the voxel spaces are identical; otherwise, a nearest-neighbor search can be used to find the closest voxel in the excluded volume voxel space.

Step 715 is as explained above for FIG. 7.

Although some embodiments have been described and shown in detail, the invention is not restricted to them, but may also be embodied in other ways within the scope of the subject matter defined in the following claims. In particular, it is to be understood that other embodiments may be utilized, and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

LITERATURE

[1] Khoshelham K, Dos Santos D R, Vosselman G. Generation and weighting of 3D point correspondences for improved registration of RGB-D data. Proc. ISPRS Ann. Photogramm. Remote Sens. Spat. Inf. Sci. 2013 Nov. 11; 5:W2.
[2] Kazhdan M, Hoppe H. Screened Poisson surface reconstruction. ACM Transactions on Graphics (TOG). 2013 Jun. 1; 32(3):29
[3] Newcombe R A, Izadi S, Hilliges O, Molyneaux D, Kim D, Davison A J, Kohi P, Shotton J, Hodges S, Fitzgibbon A. KinectFusion: Real-time dense surface mapping and tracking. In: Mixed and augmented reality (ISMAR), 2011 10th IEEE international symposium on 2011 Oct. 26 (pp. 127-136). IEEE
[4] Long J, Shelhamer E, Darrell T. Fully convolutional networks for semantic segmentation. In Proceedings of the IEEE Conference on Computer Vision and Pattern Recognition 2015 (pp. 3431-3440).

What is claimed is:

1. A method for generating a digital 3D representation of at least a part of an intraoral cavity, the method comprising:
   recording a plurality of views containing surface data representing at least the geometry of surface points of the part of the intraoral cavity using an intraoral scanner, wherein the surface data also comprises color information;
   determining a weight for at least some of the surface points at least partly based on scores that are measures of belief of that surface point representing a particular type of surface; and
   executing a stitching algorithm that performs weighted stitching of the surface points in said plurality of views to generate the digital 3D representation based on the determined weights;
   wherein the scores for the surface points are found by at least one score-finding algorithm wherein the at least one score-finding algorithm is a machine-learning algorithm trained on color images
   wherein the at least one score-finding algorithm takes as input at least the geometry part of the surface data for that surface point and surface data for points in a neighbourhood of that surface point.

2. A scanner according to claim 1, wherein the at least one machine learning algorithm comprises a neural network with at least one convolutional layer.

3. The method according to claim 1, wherein the at least one machine learning algorithm was trained on a plurality of the types of surfaces that are commonly recorded with scanners in intraoral cavities.

4. The method according to claim 1, wherein at least one machine learning algorithm was trained at least partly using data recorded by an intraoral scanner prior to the generation of the digital 3D representation.

5. The method according to claim 1, wherein at least one machine learning algorithm was trained at least partly by an operator of the intraoral scanner.

6. The method according to claim 1, wherein another algorithm evaluates geometric consistency over a plurality of views.

7. The method according to claim 1, wherein the scanner also supplies some certainty information of measured surface data for the recorded views, and where said certainty information at least partly modifies the scores.

8. A scanner system for reconstructing a digital 3D representation of at least a part of an oral cavity, the scanner system comprising;
   a handheld intraoral scanner;
   a processing unit configured to execute a stitching algorithm that performs weighted stitching of surface points for a plurality of views to the digital 3D representation, the weight of each surface point in the stitching being determined at least partly by scores that are measures of belief of said surface point representing a particular type of surface;
   wherein the scores for a surface point are found by at least one score-finding algorithm that takes as input at least the geometry part of the surface data for that surface point and surface data for points in a neighbourhood of that surface point.

* * * * *